United States Patent [19]
Bader

[11] Patent Number: 5,468,394
[45] Date of Patent: Nov. 21, 1995

[54] PRECIPITATION AND SEPARATION OF SALTS, SCALE SALTS, AND NORM CONTAMINANT SALTS FROM SALINE WATERS AND SALINE SOLUTIONS

[76] Inventor: Mansour S. Bader, 1200 N. Perkins Rd., 2C, Stillwater, Okla. 74075

[21] Appl. No.: 251,489
[22] Filed: May 31, 1994
[51] Int. Cl.$^6$ .................. C02F 1/58; C02F 1/60
[52] U.S. Cl. ............ 210/729; 210/787; 423/11; 423/158
[58] Field of Search .............. 210/729, 747; 252/626, 631, 635; 23/300; 423/158, 249, 2, 3, 11

[56] References Cited

U.S. PATENT DOCUMENTS 2,402,668  6/1946  Roller ........................ 23/300
3,437,451  4/1969  Every et al. ............... 210/729

Primary Examiner—Neil McCarthy

[57] ABSTRACT

In this invention, a novel process for saline waters and saline solutions conversion has been provided that requires only a fair amount of a miscible organic solvent and heat transfer. Such requirements are ordinary in the nature of precipitation and vaporization. The invented process consists of adding a miscible (strongly associated) organic solvent to saline water so that salt precipitates of the saline water is formed. The resultant salt precipitates (pure solids) is then separated from the organic-water mixture. After separating the salt precipitates, the miscible organic solvent is removed and recovered from the organic-water mixture by applying vacuum with or without heating, or by using distillation methods. The separated miscible organic solvent can then be condensed and returned to the process and water is stripped of trace of miscible organic solvent, and removed from the system as product water. The invented process is potentially suited for the precipitation and separation of salts, scale salts, and NORM contaminant salts form saline water and saline solution as well as for the remediation of contaminated soils.

6 Claims, 4 Drawing Sheets

PRECIPITATION AND SEPARATION OF SALTS, SCALE SALTS, AND NORM CONTAMINANT SALTS FROM SALINE WATERS AND SALINE SOLUTIONS

BACKGROUND OF THE INVENTION

Water is the inheritable solvent for a wide variety of dissolved salts, simple and complex. Saline waters such as sea water, brine water, oil-field brine water, formation water, brackish water, ground water, salt lake water, make-up saline solution, and the like are usually high in some of the following species: (1) Salts: chloride salts, sulfate salts, carbonate salts; (2) Scale Salts: barium, calcium, and strontium in the form of sulfates, carbonate and silicates; and (3) Naturally Occurring Radioactive Materials (NORM) contaminant salts, or the decay chain of uranium ($^{238}U$, $^{234}Th$, $^{234}U$, $^{230}Th$, $^{226}Ra$, $^{222}Rn$, $^{218}Po$, $^{214}Pb$, $^{214}Bi$, $^{214}Po$, $^{210}Pb$, $^{210}Bi$, $^{210}Po$, and $^{206}Pb$). Such species are rendering saline waters either unusable (e.g., high total dissolved solids) or posing serious disposal problems (e.g., disposing brine stream from membrane processes and NORM contaminant salts), industrial problems (e.g., scale formation), and health and environmental concerns.

The scarcity of natural resources of usable water in arid and semi-arid areas has a significant impact on the economic development. Conventional desalination and membrane separation technologies present relatively expensive technologies to separate salts form saline waters, which are applicable primarily on a regional basis. Further, the relatively high cost of water redistribution appears to preclude the economical transportation of water over long distances. Consequently, the agricultural growth in arid areas for instance, is restricted because of a limited usable water supply.

The concentrations of salts and scale salts in saline water are quite high, and thus the permeate (product) stream is limited to about 70% of the overall feed stream in conventional desalination processes such as membrane processes. The disposal of the remaining 30%, which is the brine stream, is a challenging engineering task. Such a task would include economic considerations, technical difficulties, and environmental regulations. Therefore, a need exists for a process, to service as an integral part of hybrid system in conjunction with membrane or other saline water conversion processes, to concentrate and reduce further the brine stream. Such a process could significantly mitigate and reduce the disposal problem.

A large volume of saline water is produced and associated with the exploration and production of petroleum, gas, coal, and fossil fuel. Several problems are associated with the produced saline water. First, scale salts and formation have a substantial impact on facilities of petroleum, gas, coal, fossil fuel and other industries since it: (1) restricts production flow; (2) causes equipment inefficiencies; (3) impedes heat transfer; and (4) damages equipment and increases shutdown time. Further, the ubiquity of uranium and thorium in the crust of the earth suggests that NORM contaminant salts will be common wherever produced saline water is salty, hot and depleted in sulfate. The uranium daughters including $^{238}U$, $^{234}Th$, $^{234}U$, $^{230}Th$, and $^{226}Ra$ are chemically active and attached themselves to nearby solid materials. As such, scale salts can become radioactive due to attachments of NORM contaminant salts. Second, the produced saline water can adversely contaminate and affect soil and vegetation. Third, serious health and environmental problems are associated with produced saline water.

Currently, there is no satisfactory method or process to separate and concentrate scale salts and NORM contaminant salts from saline waters or contaminated soils. Downhole disposal is the available option for the disposal of such species. However, economic, technical, and logistic considerations are associated with such an option. Further, downhole is inappropriate for high volume salt streams such as contaminated soils. As such, a process for the separation and concentration of scale salts and NORM contaminant salts from saline waters and contaminated soils is urgently needed. Such a process could concentrate and reduce the scale salts and NORM contaminant salts, and thus could make the downhole disposal a more feasible option.

The above situations have led me to invent the process that is described in this invention to alleviate the problems associated with the use and production of saline waters and contaminated soils.

SUMMARY OF THE INVENTION

A novel process for saline waters conversion has been invented which requires only a fair amount of a miscible organic solvent and heat transfer. These requirements are ordinary in the nature of precipitation and vaporization. The invented process consists of adding a miscible (strongly associated) organic solvent to saline water so that salt precipitates of the saline water is formed. The resultant salt precipitates (pure solids) is then separated from the organic-water mixture. After separating the salt precipitates, the miscible organic solvent is removed and recovered from the organic-water mixture by applying vacuum with or without heating, or by using distillation methods. The separated miscible organic solvent can then be condensed and returned to the process, and water is stripped of trace of miscible organic solvent, and removed from the system as product water. Applying vacuum or using distillation methods to strip out the miscible organic solvent, however, depend upon the economic feasibility, the required purity of the product water, and the environmental regulations. The miscible organic solvent that exists in the product water is essentially at infinite dilution.

BRIEF DESCRIPTION OF THE DRAWINGS

For the purpose of illustration of this invention, there are shown in the enclosed figures, precipitation phase diagrams and a process for the precipitation and separation of salts, scale salts, and NORM contaminant salts from saline waters and saline solutions. It is to be understood that such figures are for the purpose of illustration only, and that the invention is not limited thereto.

DETAILED DESCRIPTION OF THE PREPARED EMBODIMENT

Figure 1:
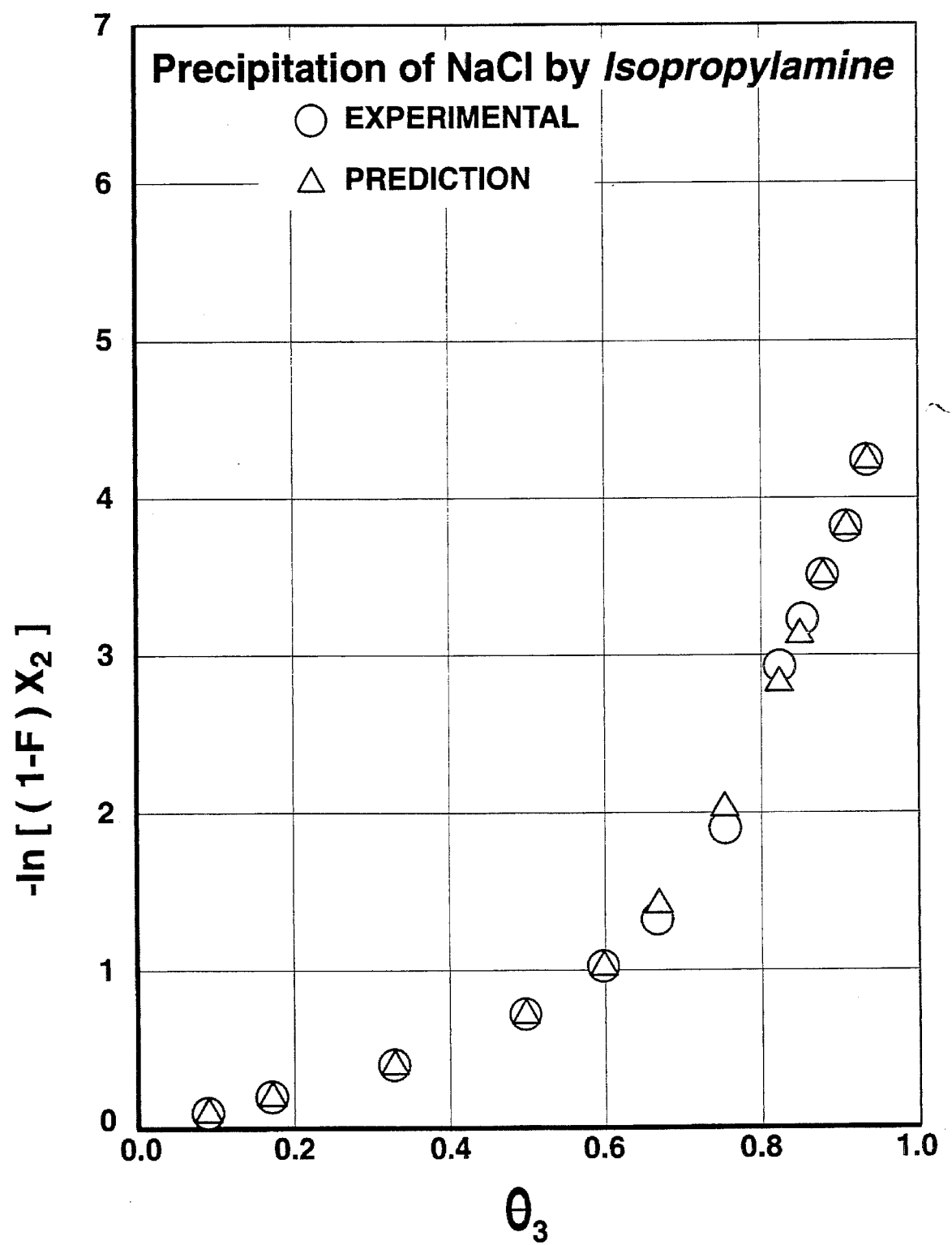
FIGS. 1 to 3 show the precipitation phase diagram of sodium chloride (NaCl) by three miscible organic solvents (isopropylamine, acetone, and acetonitrile).
Figure 2:
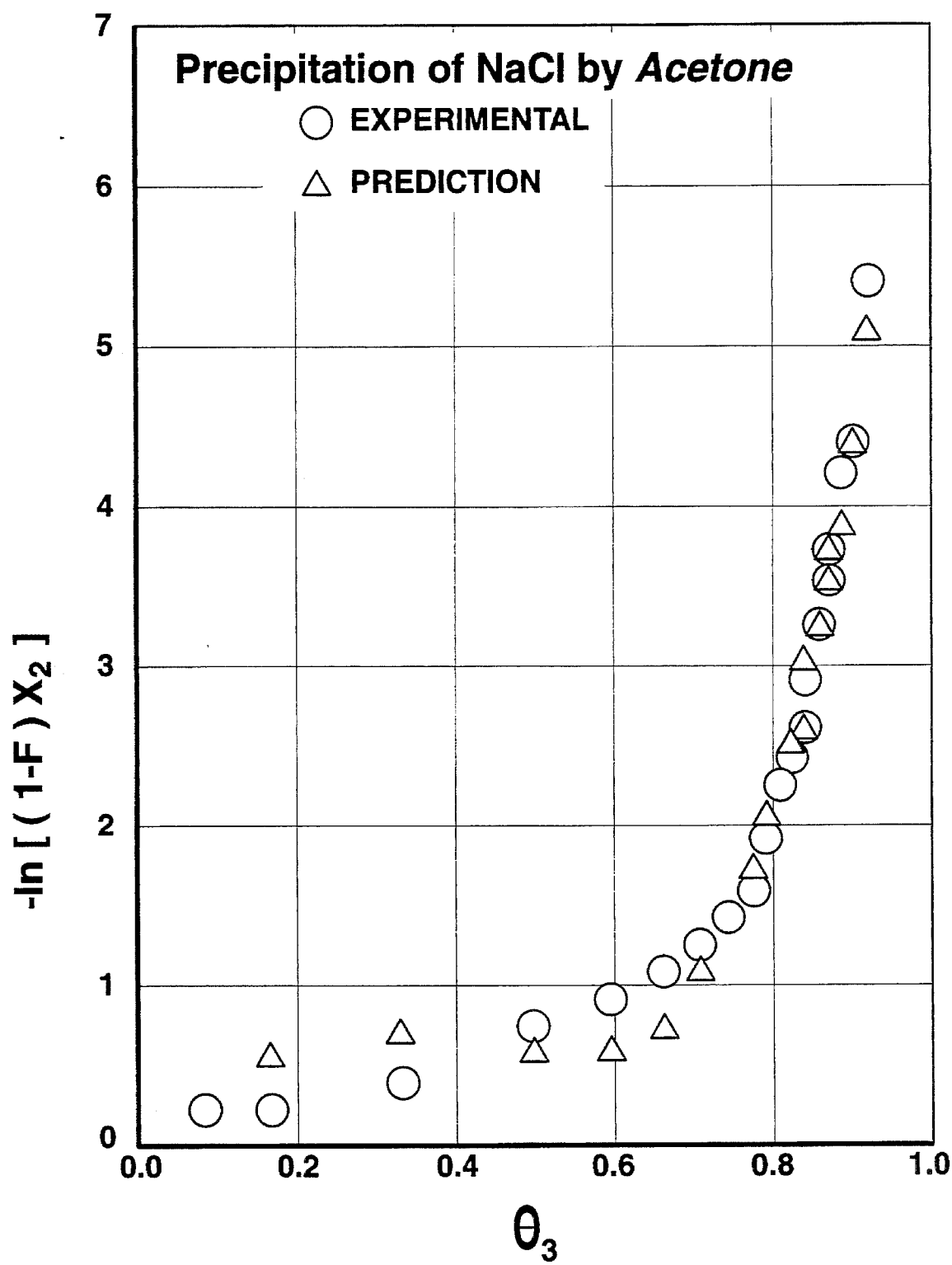
Figure 3:
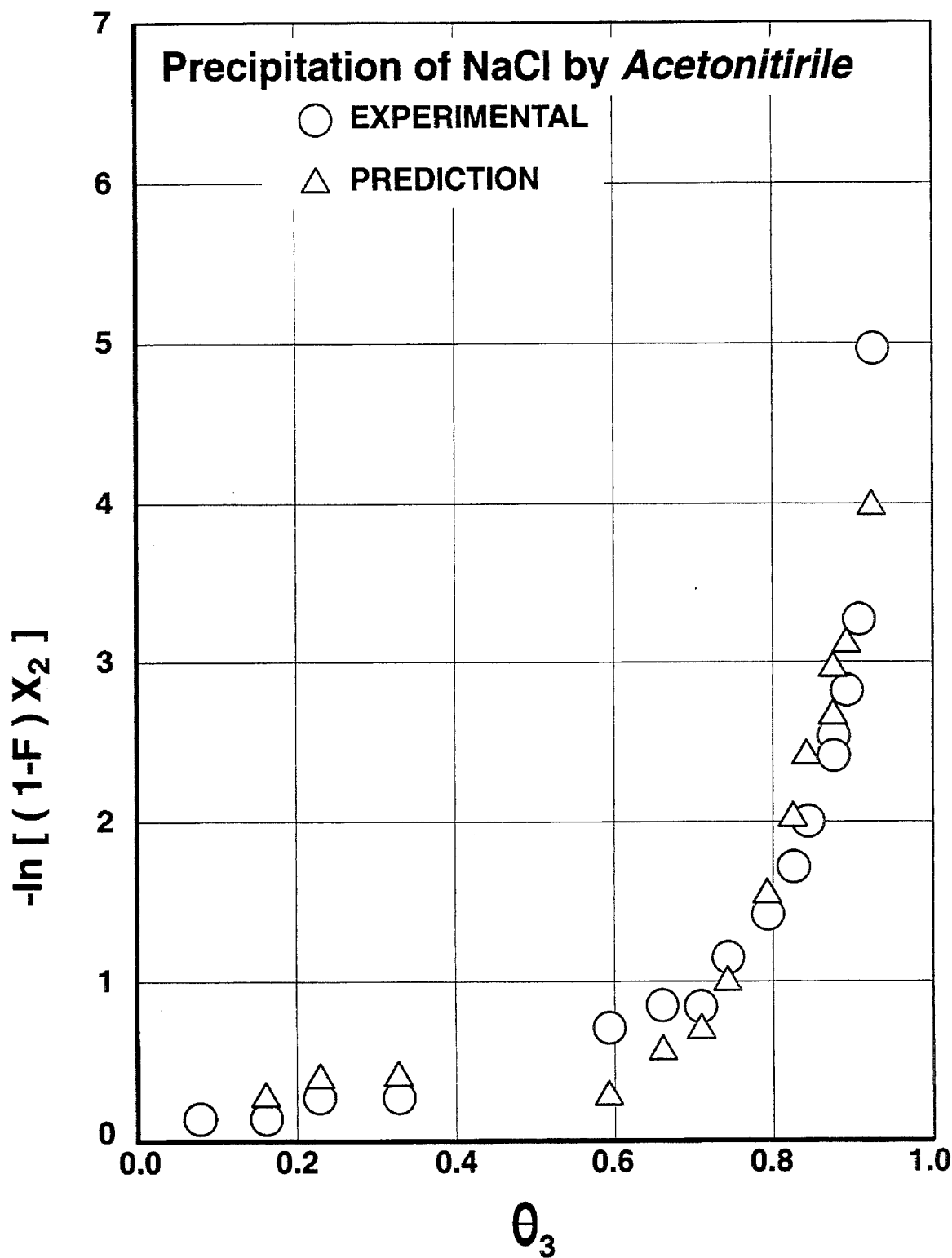

There are a number of miscible organic solvents which are appropriate for the use in this invention. The preferred miscible organic solvents are those which: (1) can cause high salt precipitation; and (2) can be vaporized at temperatures near the ambient temperature (e.g., low boiling point, relatively high vapor pressure and relative volatility). The fast vaporization of the miscible organic solvent requires only the application of vacuum, which is considerably more economical than the relatively high cost of heat transfer in the conventional distillation methods. The above factors primarily determine the best candidate among the miscible organic solvents. However, miscible organic solvents with minimal environmental risks (e.g., not carcinogens) and low cost are preferred.

The precipitation action is carried out as a solid-liquid phase equilibrium process. Several miscible organic solvents in their liquid-phase can be used in this invention. These miscible organic solvents are isopropylamine, propylamine, acetone, methanol, ethanol, acetonitrile, diisopropylamine, tetrahydrofuran, and dioxane. The above miscible organic solvents are listed as examples, and many others are known to be miscible in water and potentially can be employed.

The advantages of using miscible organic solvents in their liquid-phase are: (1) work at actual conditions (e.g., ambient temperatures); (2) good contact and mixing between species; (3) better control over the dose, transportation and handling of the miscible organic solvent; and (4) better separation of the species in different phases. It should be understood that preferring miscible organic solvents in the liquid-phase does not preclude the use of other miscible organic solvents in the gas-phase such as dimethylamine, ethylamine, diethylamine, and acetaldehyde, and the like.

Isopropylamine is the preferable miscible organic solvent among other solvents for the invented process because of its: (1) high precipitating capability with several salts; (2) low boiling point (32.5° C.) and very high relative volatility (84339); and (3) minimal environmental risks. In addition, isopropylamine has been used as a herbicide (isopropylamine salt) for agricultural purposes.

The precipitation action is unique. With a saline water containing different salts, the addition of a certain amount of isopropylamine will lead to precipitation of these salts in different percentages. For instance, the addition of enough isopropylamine to saline water containing NaCl (fifteen times the original volume of the saline water) will lead to precipitation of more than 94% of NaCl in a pure solid form. It is clear that this single stage process will waste both the miscible organic solvent and the energy required to strip out and recover the miscible organic solvent. Great savings in the amount of the valuable miscible organic solvent and the energy can be achieved by using a multi-stage precipitation process. Thus, it will be more economical for the precipitation of NaCl, for instance, with isopropylamine to precipitate 17.3% in each stage. The ratio of isopropylamine to saline water to precipitate 17.3% of NaCl is 0.2 to 1. This amount of isopropylamine will also lead to precipitate different fractions of other salt species.

Figure 4:
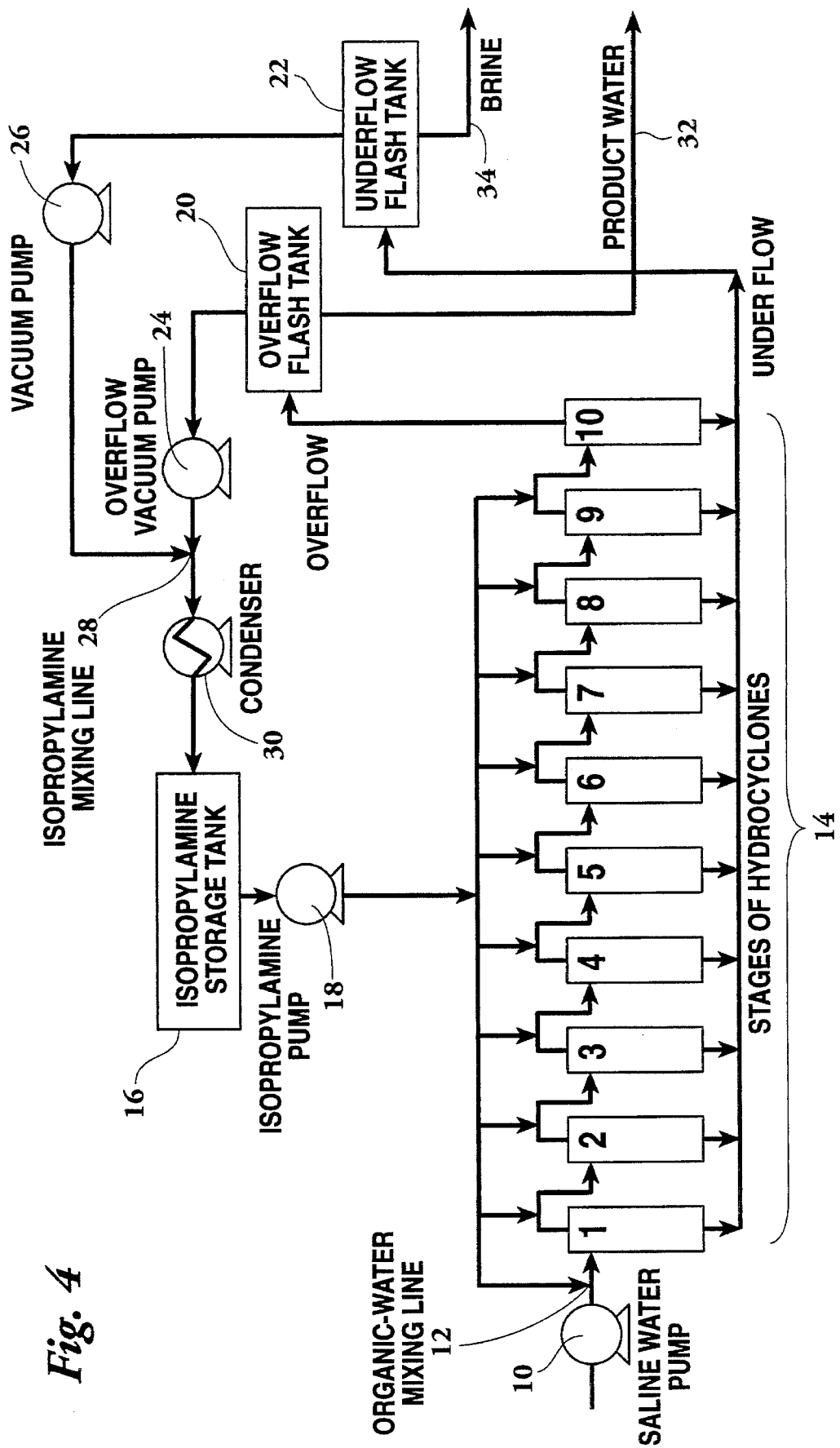
FIG. 4 is a flow sheet revealing the process for precipitation and separation of salts, scale salts, and NORM contaminant salts from saline water.

For the purpose of illustration of the invented process, reference is now made to the flow sheet of the process to desalt saline water as shown in FIG. 4. In this process, 27.8 GPM (40,000 GPD) with 5,000 ppm TDS of saline water [not shown] is pumped using the saline water pump [10] to the first stage of multi-hydrocylcones [14] via the organic-water mixing line [12] where it is contacted with 5.6 GPM of isopropylamine (ratio of 1 to 0.2). The isopropylamine is fed to the organic-water mixing line from the isopropylamine storage tank [16] using the isopropylamine pump [18].

After that, the precipitated solid salts in the first stage of hydrocyclone are separated from the over flow organic-water mixture by the multi-hydrocylones. With the multi-hydrocyclone design, the under flow for each stage can be limited to approximately 0.4 GPM. The amount of isopropylamine in the under flow for each stage is about 0.08 GPM and the remainder is water and solid salt precipitates. These calculations are based on a volume basis, taking into account the specific gravity of the liquid (water and isopropylamine) and solid salt precipitates.

Thermodynamic behavior provides us with explicit information regarding the intermolecular interactions that take place in the precipitation process. According to the thermodynamic model that predicts the phase-behavior of precipitation process, the fundamental assumption in the design of the hydrocyclone stages is based on the changes in the chemical potentials (fugacities) in terms of physically measurable quantities such as temperature, pressure and composition. At relatively constant temperature and moderate pressure, changing the composition of the miscible organic solvent, combined simultaneously with the change in the composition of the salt due to the precipitation action, will lead to changes in the phase equilibrium of the mixture. Thus, for all of the following stages of the hydrocyclones (stage 2 to stage 10), 0.01 GPM of isopropylamine is added to the overflow in each stage to compensate for the losses in the under flow and to enhance the precipitation process.

Each separation stage contains five hydrocyclones, and each hydrocyclone has a one inch diameter. A valve is installed on the discharge of the under flow chamber to act as a grit pot. With this type of arrangement, one feed pump [10] can be used to the first stage and take the over flow directly into the next stage. Hydrocyclones are able to separate particles ranging from 4 microns to about 600 microns. The advantages of using hydrocyclones in the design of the invented process are: (1) very simple equipment; (2) low maintenance (continuous operation without moving parts); (3) relatively inexpensive; and (4) easy to install.

After the last stage of hydrocyclones, the over and the under flows are fed into two different vacuum vessels (liquid-vapor separators). These vessels are the over flow flash tank [20] and the under flow flash tank [22], which are used respectively to strip out and recover the isopropylamine from water, and water-solid salt precipitates mixture, by using two vacuum pumps [24,26].

The recovered isopropylamine (99.91% recovery) is fed into a condenser (a shell and tube heat exchanger) [30] via the isopropylamine mixing line [28] and then returned to the process via the storage tank [16] and the isopropylamine pump [18].

The product water [32] is removed to the aerated water pond as a product, while the brine [34] is removed to a disposable area. The desorption of isopropylamine from the product water in the aerated pond to the air can be aided by a mechanical agitator.

The experimental data, thermodynamic phase behavior model, and design of the invented process by the present inventor are incorporated by references as may required.

The illustrative example has targeted NaCl, which is the major chloride salt, the most soluble one in water, and the least precipitate. The operating costs of the invented process indicate that the major factor is the isopropylamine cost and the amount of heat transfer needed to recover isopropylamine. However, most of saline waters, except may be seawater and/or salt lake water, are commonly dominated by sulfate salts, carbonate salts, silicate salts and chloride salts other than NaCl. The solubilities of such salts are much lower than the solubility of NaCl in water, and thus conceptually their solubilities can be drastically reduced (by the precipitation concept) by adding a small amount of a miscible organic solvent. Practically, such species can be easily precipitated from the saline waters using the invented process with a much lesser number of hydrocyclone stages and a much smaller amount of isopropylamine (or other miscible organic solvents). As such, an appreciable reduction in the quantity (and of course the cost) of isopropylamine is directly led to a substantial reduction in the amount of heat transfer, and thus a significant reduction in the capital and operating costs of the invented process.

In the case of soil remediation, the contaminated soil with salts, scale salts, and NORM contaminant salts can be placed into a lined lagoon and mixed with an excess amount of water to dissolve the salt species and form a make-up saline solution. The lagoon could also serve as clarifier to settle the sediment from the make-up saline solution prior to the precipitation and separation process. After that, the invented process that is described in this invention can be used to precipitate and separate the salt species from the make-up saline solution.

The invented process can perfectly lend itself to modular skid-mounted construction. Various changes and modifications may be made in the flow sheet. It should be understood that saline waters such as sea water, brine water, oil-field brine water, formation water, brackish water, ground water, salt lake water, make-up saline solution, and the like can be used in this invention. Further, isopropylamine has been mentioned as the miscible organic solvent to be used, but it should be understood that other miscible organic solvents such as propylamine, acetone, methanol, ethanol, acetonitrile, diisopropylamine, tetrahydrofuran, dioxane and the like may also be employed.

It should also be understood that the operating equipment and conditions set forth may be varied to fit: First, different circumstances such as: (1) the type, concentration, and number of salt species present in the saline waters and saline solutions to be precipitated and separated, and (2) the purposes of desalting saline waters and saline solutions such as agricultural, brine concentration, scale removal, industrial, salts recovery, soil remediation, carrier free radioactive material recovery and the like; and Second, different geographical locations and climate conditions.

I claim:

1. A method of removing salt from an aqueous solution comprising said salt and water, said method comprising the step of (a) adding an effective amount of a miscible organic solvent to said solution to cause at least a portion of said salt to form a solid precipitate, wherein said organic solvent is an amine selected from the group consisting of isopropylamine, propylamine, diisopropylamine, dimethylamine, ethylamine, and diethylamine and wherein said salt is a scale salt selected from the group consisting of sulfates, carbonates, and silicates of barium, calcium, and strontium.

2. The method of claim 1 wherein said organic solvent is isopropylamine.

3. The method of claim 1 further comprising the steps of:
   (b) separating said solid precipitate from said water having said miscible organic solvent added thereto and
   (c) separating said miscible organic solvent from said water.

4. The method of claim 3 wherein said solid precipitate is separated from said water having said miscible organic solvent added thereto using at least one hydrocyclone.

5. A method of removing a naturally occurring radioactive material salt from an aqueous solution comprising said naturally occurring radioactive material salt and water, said method comprising the step of adding an effective amount of a miscible organic solvent to said solution to cause at least a portion of said salt to form a solid precipitate, wherein said naturally occurring radioactive material salt is selected from the group consisting of salts of $^{238}U$, $^{234}Th$, $^{234}U$, $^{230}Th$, $^{226}Ra$, $^{222}Rn$, $^{218}Po$, $^{214}Pb$, $^{214}Bi$, $^{214}Po$, $^{210}Pb$, $^{210}Bi$, $^{210}Po$, and $^{206}Pb$; and combinations thereof and wherein said organic solvent is an amine selected from the group consisting of isopropylamine, propylamine, diisopropylamine, dimethylamine, ethylamine, and diethylamine.

6. The method of claim 5 wherein said miscible organic solvent is isopropylamine.

\* \* \* \* \*